Mar. 27, 1923.

I. CISSKI

PISTON AND PISTON RING

Filed Nov. 28, 1921

1,450,134

Inventor.
IRVING CISSKI
By
Attorney

Patented Mar. 27, 1923.

1,450,134

UNITED STATES PATENT OFFICE.

IRVING CISSKI, OF SEATTLE, WASHINGTON.

PISTON AND PISTON RING.

Application filed November 28, 1921. Serial No. 518,262.

*To all whom it may concern:*

Be it known that I, IRVING CISSKI, a citizen of the United States, and a resident of Seattle, county of King, and State of Washington, have invented a new and useful Piston and Piston Ring, of which the following is a specification.

The present invention relates to improvements in pistons and piston rings and its object is to provide a single piston ring for a piston which is particularly efficient in preventing any gases from escaping from the combustion chamber and which at the same time will exercise a constant control over the oil admitted between the piston and the cylinder wall. One of the advantages to be gained by my construction is the fact that one piston ring is sufficient to do the work now commonly accomplished by a plurality of rings. Another advantage is that my single piston ring is positioned in such a manner as to be exposed to the expanding gases within the combustion chamber and to be thereby forced into firm contact with the cylinder wall as well as the piston itself whereby any possible leakage is prevented. A further advantage of my ring is that it is so constructed that on its upward stroke, while approaching the combustion chamber, it glides over the film of oil between the piston and the cylinder wall, while on its downward stroke it engages the oil film and carries along any excessive amount of oil that may have gathered between the piston and the cylinder wall. Means are provided at the same time for allowing the oil thus engaged by the downwardly moving piston ring to escape through properly designed passages into the interior of the piston from where it returns to the crank case.

Figure 1:
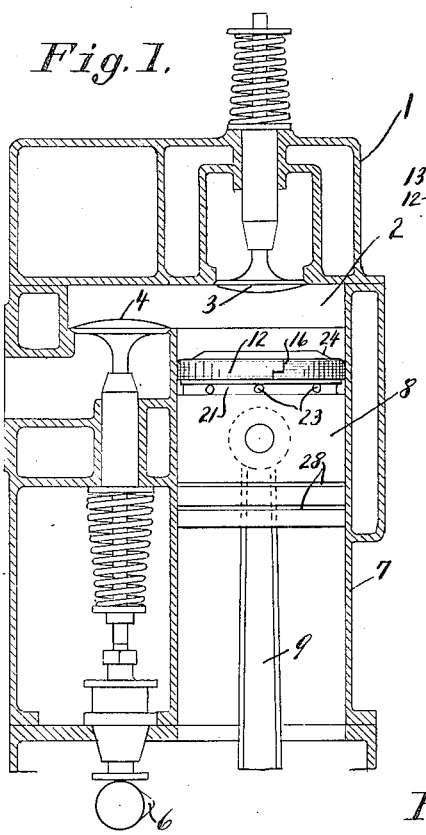
Figure 2:
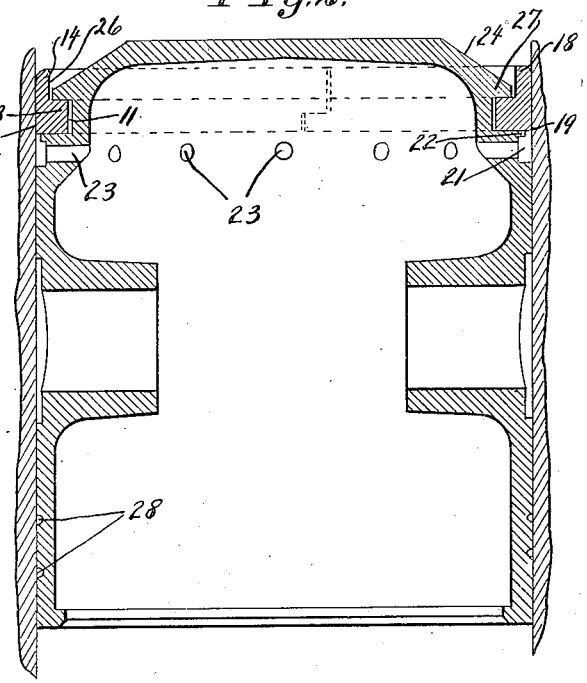

With these objects in view I have illustrated the preferred form of my invention in the accompanying drawing in which Figure 1 represents a vertical cross section through a common type of internal combustion engine; Figure 2 an enlarged detail view in cross section through my piston having my ring secured thereto, and Figure 3 a perspective view of my ring, a portion of the same being shown in cross section.

While the drawings show the preferred form of my device, I wish to have it understood that changes or modifications may be made within the scope of the claims without deviating from the spirit of the invention.

The internal combustion engine (1) illustrated in Figure 1 comprises the combustion chamber (2), the intake valve (3), the exhaust valve (4) controlled by the cam (6), the cylinder (7) and the piston (8) adapted to be reciprocated in the cylinder and to transmit its motion by means of the connecting rod (9). No novelty is claimed for the particular construction of the internal combustion engine shown in Figure 1, this invention being confined altogether to the construction of the piston. It will be assumed for the purpose of this description that the compression chamber is above the cylinder as is the case in most automobile engines, but it will be understood that my piston will work with the same efficiency irrespective of the position of the combustion chamber relative to the piston.

Figure 3:
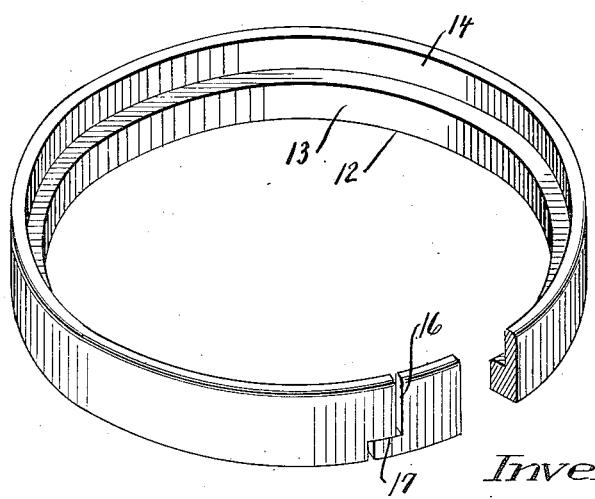

It will be seen from Figure 2 that the piston is provided near its top with an annular groove (11) into which fits loosely, as shown in the drawing, the piston ring (12) illustrated in Figure 3. The latter comprises a body portion (13) and a flange (14) extending upwardly from the same, and is cut in a staggered line as shown at (16), the step (17) being preferably disposed in the center of the body portion (13). The ring with its flange offers a wider bearing surface to the cylinder wall than is ordinarily the case where a plurality of rings are used, and it will be noticed that the top edge (18) of the flange is rounded off while the lower edge (19) is sharp, so that on its upward travel the ring will glide over any oil film between the cylinder wall and the piston, while on its downward travel the sharp edge (19) will have a tendency to scrape off any surplus oil and to unload the same into the peripheral oil trapping groove (21) provided underneath the same, the ring supporting annular projection (22) not extending sufficiently far to interfere with the delivery of the oil into the trapping groove. From the latter groove a plurality of passages (23) lead to the interior of the piston so that any oil accumulating in the trapping groove may pass through the passages into the inside of the piston and from there back to the crank case.

It will be noticed that the upper edge of the piston is beveled as shown at (24) and that the flange (14) of the piston ring extends considerably above the edge of the piston so as to present practically its entire inner surface (26) to the expanding gases within the combustion chamber. The diameter of the upper portion (27) of the piston which bears down on the piston ring is reduced sufficiently so as to allow the ring to play freely between the piston and the cylinder wall.

Near its bottom the piston is provided with a plurality of annular grooves (28) adapted to properly distribute the oil over the circumferential surface of the piston. The advantages of my piston ring will be seen immediately. When the gases in the combustion chamber expand they bear against the piston ring in a downward direction as well as laterally, thus forcing the piston ring into close contact with the bottom of the groove (11) and simultaneously firmly pressing the ring against the cylinder wall, whereby any leakage of the expanding gases is prevented. On the compression stroke the piston ring will be subject to the same influences with the same result. The oil film between the piston and the cylinder wall is at the same time regulated by the ring, the same being able, due to its rounded upper edge, to easily glide over the oil film on its upward stroke while on its downward stroke its lower sharp edge removes any excessive oil from the cylinder wall and delivers the same into the oil trapping groove (21), from where it finds its way back into the crank case through the passages (23). In this manner the oil is caused to circulate from the crank case around the piston and back to the crank case, which constitutes a particular advantage of my device since in the pistons now commonly used there is no provision made for the removal of the oil after it has performed its function, and its only outlet is into the combustion chamber where it forms the obnoxious carbon deposits. It need not be stated that the prevention of any leakage during the compression stroke as well as during the power stroke, and the free circulation of oil around the piston will serve to render the engine more effective and to substantially increase its power.

I claim:

1. For an internal combustion engine, a piston having a peripheral groove therein and a ring fitting loosely in the groove having an annular projection extending beyond the piston so as to be subject directly to the pressure within the combustion chamber and presenting a dull edge to the cylinder wall as viewed from the combustion chamber and a sharp edge as viewed from the opposite end, and a plurality of passages leading from the sharp edge to the interior of the piston.

2. For an internal combustion engine, a piston having a peripheral groove therein, a ring fitting loosely in the groove having an annular projection extending beyond the piston so as to be subject directly to the pressure within the combustion chamber and presenting a dull edge to the cylinder wall as viewed from the combustion chamber and a sharp edge as viewed from the other end, and an oil trapping groove in the piston connected with the sharp edge having a plurality of communications with the interior of the piston.

IRVING CISSKI.